United States Patent [19]
Hood et al.

[11] Patent Number: 5,282,195
[45] Date of Patent: Jan. 25, 1994

[54] DS0 CROSS-CONNECT FOR FLOATING VIRTUAL TRIBUTARIES

[75] Inventors: David F. Hood, Palo Alto; Anna M. Greco, Grass Valley; Tee Kuhanont, Oceanside; Roy R. Kurz, Poway; Ralph O. Wickwire, San Diego, all of Calif.

[73] Assignee: Raynet Corporation, Menlo Park, Calif.

[21] Appl. No.: 755,273

[22] Filed: Sep. 5, 1991

[51] Int. Cl.$^5$ .............................................. H04J 3/02
[52] U.S. Cl. .................................................. 370/58.1
[58] Field of Search ................... 370/54, 61, 58.1, 53, 370/65.5

[56] References Cited

U.S. PATENT DOCUMENTS

| | | | |
|---|---|---|---|
| 4,393,381 | 7/1983 | Seiden | 370/67 |
| 5,128,926 | 7/1992 | Perlman et al. | 370/54 |
| 5,136,580 | 8/1992 | Videlock et al. | 370/61 |
| 5,136,581 | 8/1992 | Muehrcke | 370/58.1 |

FOREIGN PATENT DOCUMENTS 0305992 8/1988 European Pat. Off. .

OTHER PUBLICATIONS

"American National Standard for Telecommunications—Digital Hierarchy-Optical Interface Rates and Formats Spec.", T1.105-1988.
CCITT draft Recommendation G.708, "Network Node Interface for the Synchronous digital Hierarchy". 1988.
CCITT draft Recommendation G.709, "Synchronous Multiplexing Structure". 1988.
"Synchronous Networking—SONET & the SDI" included within colloquium The Changing Face of Telecommunications Transmission, presented by Professional Group E7 (Telecommunications Networks & Systems, IEE, London, England, pp. 1/6–6/27.
Bellcore, TR-TSU-000303, Sup 2, Issue 1, Oct. 1989, "IDLC System Generic Requirements, Objectives and Interface: Feature set C-SONET Interface".
4.4.2. "Digital Technology . . . Spanning the Universe", IEEE ICC'88, Philadelphia, PA, 6/12–15/88, vol. 1, pp. 0349–0354.

Primary Examiner—Douglas W. Olms
Assistant Examiner—Min Jung
Attorney, Agent, or Firm—Dennis E. Kovach; Herbert G. Burkard

[57] ABSTRACT

A method and apparatus for cross-connecting arbitrary fragments of an incoming virtual tributary synchronous payload envelope, or arbitrary fragments of any incoming transmission stream, at a cross-connect element within a communications network is provided without incurring a delay associated with aligning a frame phase of the first digital stream to any arbitrary frame timing reference. The arbitrary fragments are sized smaller than a complete virtual tributary, or equivalent thereof, of the first digital stream, and comprise one or more incoming payload bytes. The incoming payload bytes have incoming identifiers related to their incoming locations and outgoing identifiers related to their outgoing locations. One method achieves this cross-connect by looking up pre-recorded cross-connect information for the fragments in a cross-connect map memory at fixed sequence storage locations related to the incoming identifiers at times synchronous with the incoming first digital transmission stream, presenting outgoing identifiers provided by the cross-connect map memory to an addressing input of the payload memory at times synchronous with the incoming fragments so as to store the incoming fragments in a payload memory in an order to be synchronous with an outgoing second digital transmission stream, and then reading the stored fragments from the payload memory from a fixed sequence of storage locations related to the outgoing identifiers at times synchronous with the outgoing second digital transmission stream. This cross-connect avoids any delay associated with first aligning or locking a frame phase of the incoming stream with any arbitrary frame timing reference.

20 Claims, 4 Drawing Sheets

FIG_1

FIG_2

FIG_3

FIG_4

DS0 CROSS-CONNECT FOR FLOATING VIRTUAL TRIBUTARIES

FIELD OF THE INVENTION

The present invention relates to digital communications networks. More particularly, the present invention relates to methods and apparatus for realizing cross-connect within a digital communications network, such as an optical digital communications network, while minimizing a delay imposed by the cross-connect operation. In particular, to methods and apparatus for realizing DS0 or byte cross-connections individually, or cross-connections of multiple DS0s (e.g. groups of DS0s smaller than the virtual tributary or digital stream in which they are encapsulated) without having to align a frame phase of the virtual tributary digital stream containing the DS0s with a frame phase of any arbitrary frame timing reference, such as a cross-connect frame phase timing or a higher rate digital stream encapsulating the virtual tributary.

BACKGROUND OF THE INVENTION

A new standard for digital telecommunications transmission is undergoing development. This new standard is variously known and referred to as the "synchronous optical network" or SONET; it is also sometimes referred to as the "synchronous digital hierarchy" or SDH. Definitions of this evolving standard appear in ANSI T1.105-1988, *American National Standard for Telecommunications—Digital Hierarchy—Optical Interface Rates and Formats Specification*; CCITT Recommendation G.708, *Network Node Interface for the Synchronous Digital Hierarchy*; and CCITT Recommendation G.709, *Synchronous Multiplexing Structure*, the disclosures of which are incorporated herein by reference. These standards currently are not wholly consistent, and they are still undergoing evolution in the respective organizations. However, the differences remaining between these standards are not pertinent to the present invention, and these standards provide those skilled in the art with a working background knowledge against which this invention will be more fully understood and appreciated.

These standards specify methods and suggest apparatus by which lower-rate digital transmission streams may be multiplexed as encapsulated data within higher-rate digital transmission streams for higher speed transmission. In North America, such lower rate streams are called "virtual tributaries" or "VTs," while the CCITT specifications refer to them as "virtual containers." For purposes of this disclosure, these terms are deemed synonymous. These lower rate digital transmission streams include, for example, 24-channel DS1 time-division-multiplex telephone services. A survey paper entitled "Synchronous Networking—SONET and the SDI" included within a colloquium entitled *The Changing Face of Telecommunications Transmission*, presented by Professional Group E7 (Telecommunications Networks and Systems), Institution of Electrical Engineers, London, England, Jan. 16, 1989, pp. 6/1 to 6/27, provides an overview as to how the new synchronous transmission standards may be used to provide a managed transmission infrastructure for flexible allocation of transport capacity among various service networks. The disclosure of this paper is also incorporated herein by reference.

Without loss of intended generality, the following discussion adopts and uses the North American terms and conventions. Thus, these standards are collectively referred to herein by the acronym "SONET." The subordinate information carriers are called "virtual tributaries" or "VTs." The concrete examples refer to 64 kilobit per second channels (DS0s) comprising 8 bit bytes transmitted at a frequency of 8 kHz (e.g. conventional digital voice frequency transmissions), the DS0s being encapsulated within so-called VT1.5s, while recognizing that the principles of the present invention apply identically to all forms of channels and VTs, not simply to DS0s and VT1.5s, and in fact to non-SONET transmission systems, e.g. DS1s.

Classically, a frame for time division multiplexing within telephony corresponds to a period of 125 microseconds, resulting in a frequency of 8 kHz. Consistent with this practice, a SONET frame occupies 125 microseconds. It comprises a matrix of eight-bit bytes. There are always nine rows and 90*N columns in the matrix, where the value of N is defined by the number of bytes actually included within the frame, i.e. the multiplexing level or data density (e.g. OC1, OC3, etc.). The choice of multiplexing level N and resultant data density does not directly bear upon or affect the present invention.

By convention each SONET frame contains overhead bytes and a so-called synchronous transport signal synchronous payload envelope, or "STS SPE." For example, at a lowest multiplex level, called optical carrier one (OC1), N equals one, there are three columns in the SONET matrix for transport overhead bytes, and there are 87 columns for the STS SPE payload. The transport overhead contains a pointer that indicates some byte position marking the beginning of the STS SPE frame. From this particular byte position, the STS SPE frame extends for the next 125 microseconds, skipping over the SONET matrix transport overhead bytes that also occur during this time.

Ideally, a communications network would be driven by a universal single clock frequency and phase without any local deviations. In practice the universal single clock has not yet been realized, though deviations can be specified and controlled. In comparison with the SONET time (OC-N) frame, the STS SPE is in essence another frame all by itself. The first byte of the STS SPE frame begins at a starting time, such as t=0, and the STS SPE frame repeats 125 microseconds later. With slight frequency variations between the SONET clock and the STS SPE clock, the STS SPE frame will move backwardly or forwardly relative to the SONET frame. Thus, the STS SPE starting byte position may not be aligned with the beginning of the SONET frame at a cross-connect location or node. Rather, the STS SPE may be shifted in time relative to the beginning of the SONET frame, and, as noted, such shift is taken into account and thereby controlled by the pointer contained in the SONET frame transport overhead bytes.

The pointer mechanism includes a definition of ways to adjust its value such that one fewer byte or one extra byte can be included in the STS SPE, as needs be, and thereby permit the STS SPE frame to move relative to the SONET frame to compensate for these slight frequency variations. It is an advantage of SONET over certain older multiplexing technologies that no payload data loss or duplication occurs in the presence of small frequency differences. The present invention preserves this advantage of SONET.

An STS SPE can transport payload in a variety of formats, known as mappings. Although the present invention is applicable to any transmission system in which time-floating payload fragments can be identified, the subsequent discussion concerns itself particularly with a subset of mappings in which the STS SPE carries a plurality of virtual tributaries, or VTs. A VT comprises a VT synchronous payload envelope (VT SPE), as well as so-called VT overhead. The actual payload is structured in 125-microsecond frames contained within the VT SPE.

VTs come in different sizes. For example, a so-called VT1.5 can transport the payload of a DS1 voice grade time division multiplex digital transmission system, so there can be 24 64-kbit/sec DS0 payload channels within a VT1.5; the STS SPE of an OC1 is capable of transporting 28 VT1.5s. Each VT occupies a fixed, known set of columns in the STS SPE. Given a knowledge of the VT structure (VT1.5, VT2, etc.), the bytes comprising any given VT can be extracted through comparatively straightforward logical operations, readily apparent from the specifications cited above. This logic must track STS SPE pointer adjustments, such that when the STS SPE shifts in time, the VTs remain in synchronism with it. Although the VT as a whole is comparatively easy to extract, locating specific bytes within the VT is more complex, and is the subject of the present invention.

SONET defines two major modes in which VTs may be encapsulated: "floating" and "locked." Locked mode assumes that there is no frequency or phase difference between the STS SPE clock and the VT SPE clock. In locked mode, any and all of the VT payload is totally known simply by counting time slots from the start of the STS SPE. Locked mode is optimized to provide DS0 visibility, at the expense of delay required to align the payload with the STS SPE. In addition, if there is a frequency difference between the payload clock and the STS SPE clock, locked tributaries are kept in alignment with the STS SPE by repeating or dropping an entire payload frame from time to time, thereby affecting the integrity of the payload data path. This is referred to as "slip buffering."

To avoid these disadvantages, the SONET standards allow for a third separate layer of timing, also nominally at an 8 kHz frame rate, the third layer allowing VTs to float relative to the STS SPE: the floating VT mapping permits the VT SPE to be transported with timing that differs in phase and frequency from the STS SPE clock. Floating VTs can be transported through SONET systems with minimal delay and without slip buffering. In much the same way that the SONET overhead provides a pointer that permits the STS SPE to shift relative to the SONET frame without loss of STS SPE integrity, each floating VT contains a pointer that locates its VT SPE, independent from the SPEs of other VTs, which have their own pointers. A VT SPE pointer is meaningless and hence undefined in the locked VT mapping which doesn't utilize this third layer of timing.

The VT pointer is located at the top of the columns of the STS SPE frame associated with a particular VT. The VT pointer selects a byte that defines the beginning of its VT SPE, contained within its set of columns (e.g. 3 columns for a VT1.5). Again, pointer adjustment rules are defined to permit the VT SPE frequency to differ from the STS SPE frequency, and payload integrity is not affected by small frequency differences. Also the pointer minimizes delay even if the frequency is the same, by allowing payload to be inserted into the VT SPE at an arbitrary time/phase.

Sub-modes of these two major modes include "bit-synchronous," "byte-synchronous," and "asynchronous." Only byte-synchronous traffic is amenable to DS0 processing, and is the focus of the present invention. The other sub-modes can be readily cross-connected as entire VTs without making use of the present invention, but no DS0 rearrangement or cross-connections would occur.

Floating VTs are optimized for cross-connect of entire VT SPEs as single units, inasmuch as cross-connect delay is minimized, payload integrity is assured, and DS0 visibility is not required. Floating VTs do not easily support cross-connection of individual DS0s or groups of DS0s, because a given payload byte may appear anywhere within the columns that define a particular VT, and its location may change from time to time. Conventionally, it has been accepted that to achieve DS0 cross-connection, floating VTs must first be locked to some common timing reference, which has a disadvantage of incurring a typical delay of one additional frame, and may affect payload integrity if clock frequency differences exist. Both of these effects are undesirable, especially if allowed to accumulate through a series of multiplex and cross-connect pieces of equipment.

DS0 cross-connect directly from floating VTs is an aim of the present invention. Since the invention has far greater application beyond SONET applications, more generally an aim of the present invention is to cross-connect individual bytes or arbitrary fragments of a digital stream, one SONET example being groups of DS0s sized smaller than a VT, without first aligning a frame phase of the digital stream containing the bytes or fragments with any common frame phase timing reference, such as a frame timing associated with the cross-connect element itself or a frame phase timing of any other incoming digital stream. As used herein, the term "byte" means any predetermined arbitrary number of bits operated on as a unit by processors associated with the cross-connect element. A commonly accepted size for a byte is 8 bits (e.g. DS0), though differing communication standards use differing bit numbers as operational units. Though the invention has utility beyond SONET, since a preferred embodiment is for use with SONET it will be further explained by reference to SONET systems.

Figure 1:
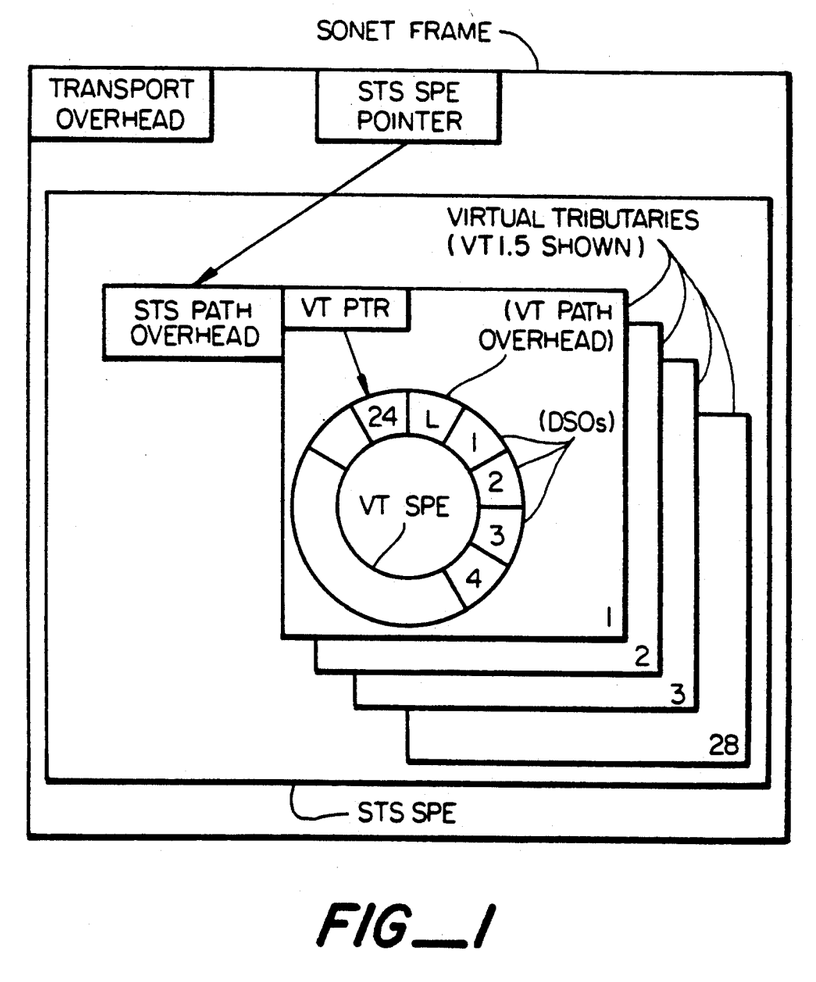
FIG. 1 is a graphic representation of a SONET frame containing an STS SPE that encapsulates a plurality of floating byte-synchronous VT SPEs (VT1.5s) that encapsulate a plurality of channels (DS0s) along with associated transport and path overhead and pointers.

FIG. 1 is a graphic representation of a SONET frame containing an STS SPE that encapsulates a plurality of floating byte-synchronous VT1.5 SPEs that encapsulate a plurality of channels (DS0s) along with associated transport and path overhead and pointers.

Digital network elements include cross-connects, add-drop or terminal multiplexes, switches, subscriber carrier terminals and any other signal processing, checking or regenerating node. The function of a digital cross-connect is to terminate standard digital multiplexed signals and to cross-connect constituents thereof under either a local or a remote control mechanism. The current state of digital cross-connect technology is summarized in a paper by B. D. Bowsher entitled "The Evolution of DCS Technology in Access and Core Networks," published in the Conference Record, *IEEE International Conference on Communications '88*, Philadelphia, Pa., held Jun. 12–15, 1988, Vol. 1, pp. 349–354. A technique for synchronizing and cross-connecting a low speed payload with a high speed data loop is described in European Patent Application 0 305 992. The disclosures of this Bowsher paper and patent application are incorporated herein by reference.

While other digital network elements typically require the capability to cross-connect digital signals only at VT and higher levels, both digital telephone network switches and digital loop carrier systems require cross-connect capability at the DS0 level, i.e. individual byte level. However, digital telephone network switches will provide floating byte-synchronous VT1.5s to digital loop carrier systems. See, for example, Bellcore, TR-TSY-000303, Supplement 2, Issue 1, October 1989, *IDLC System Generic Requirements, Objectives and Interface: Feature set C-SONET Interface.* 4.4.2. The disclosure of the entire Bellcore, TR-TSY-000303 paper is incorporated herein by reference, in addition to 4.4.2.

Figure 2:
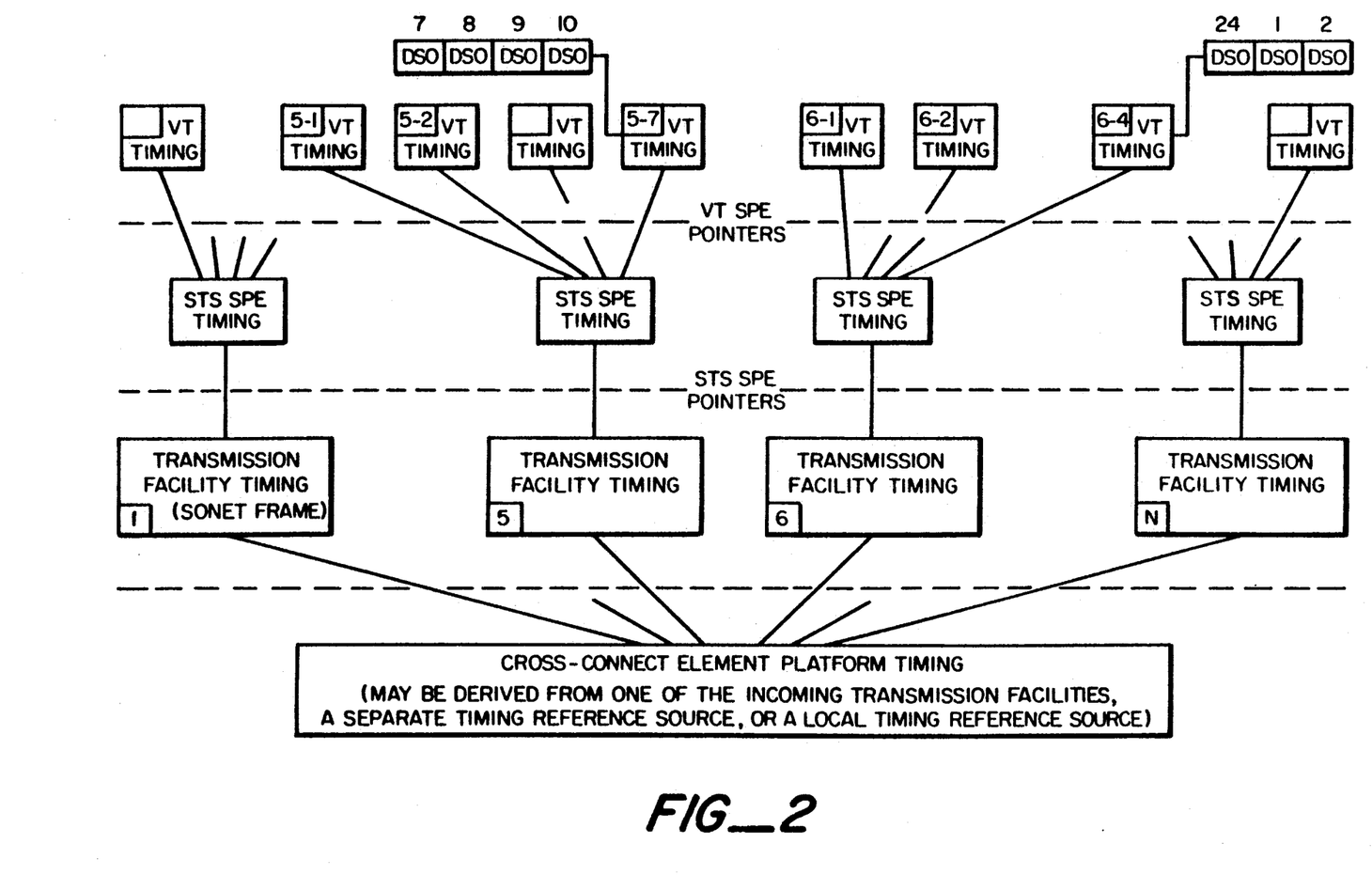
FIG. 2 illustrates a block diagram of typical multiple inputs associated with a cross-connect element.

FIG. 2 illustrates a block diagram of typical multiple inputs associated with a cross-connect element, showing the various timing interfaces that may exist. The subsequent example discussions assume cross-connection between DS0 #9 of VT #7 of transmission facility #5 and DS0 #2 of VT #4 of transmission facility #6, as illustrated in FIG. 2.

For a network element to cross-connect DS0s or fragments of a floating virtual tributary payload signal according to the prior art, a minimum of one frame delay is required to align the digital stream containing the DS0s with a local frame reference as a necessary part of the processing overhead associated with that particular element in converting from floating to locked mode. An additional frame delay then occurs during the actual cross-connect operation. As digital network elements proliferate within the worldwide communications grid, the frame delays accumulate. Cumulative frame delays over an extended communications path contribute to echo, a very undesirable drawback.

By way of further explanation, if a system were cross-connecting an entire STS SPE from a first transmission facility to a second transmission facility whose SONET frame had a beginning displaced in time from the beginning of the SONET frame of the first transmission facility, a given byte in the STS SPE of the SONET frame of the first transmission facility could be located by a particular row and column number relative to the incoming SONET frame. Relative to the outgoing SONET frame, that same byte could be defined with the same row and column number, but at the expense of an unnecessary delay of up to one additional frame. Alternatively, the byte could be defined to the second transmission facility at the same instant but with a different row and column number. By adjusting the STS SPE pointers for this offset, this byte can be copied from the input frame to the output frame without the additional delay, i.e. there will not be a frame latency. This characteristic is a part of the SONET specification, and results in delay minimization by providing for cross-connection of STS SPEs as integral units.

Similarly, floating VTs can also be cross-connected as integral units, this process essentially being one layer deeper than STS SPE cross-connection as integral units, and requiring both STS and VT pointers to be simultaneously accounted for.

As mentioned, if it is desired to cross-connect an individual channel, byte, or a VT fragment from a VT, the traditional approach has been to lock or align the VT with the digital network element's common system timing. This process introduces the additional frame of delay previously mentioned and may impair the integrity of the payload, since possible frequency drift between the digital network element's common system timing and VT SPE clocks can only be accommodated by dropping or repeating payload frames (slip buffering).

According to this prior practice, DS0 cross-connect equipment locks floating VTs relative to the digital network element's common system timing, with an associated overhead cost in terms of hardware, transmission delay, and payload quality degradation. It is clearly desirable to be able to cross-connect individual DS0s or groups of DS0s without having to lock their VTs.

Therefore, a hitherto unsolved need is for a new method to realize and achieve cross-connect for DS0s, bytes, or payload fragments (VT fragments) between floating VTs with no appreciable increase in implementation cost, compared to the cost of cross-connecting DS0s in locked VTs.

SUMMARY OF THE INVENTION WITH OBJECTS

According to the invention, individual bytes, DS0s, or groups thereof sized smaller than the lowest rate digital stream in which they are contained, are cross-connected without first aligning a frame phase of the lowest rate digital stream to a digital network element's common system timing without the additional delay previously mentioned for aligning or locking, and allowing such DS0 or byte individual or group cross-connection without unnecessary delay is an object of the present invention.

A specific object of the present invention is to provide, in a manner that overcomes limitations and drawbacks of the prior art, cross-connect for individual DS0s or arbitrary groups of DS0s less than the entire floating virtual tributaries within which they are encapsulated, the floating virtual tributaries being encapsulated within SONET STS SPEs of a digital communications network.

Another specific object of the present invention is to provide a method enabling payload bytes (single or multiple channels) of floating virtual tributaries to be cross-connected between transmission facilities at a cross-connect element of a digital communications network wherein the cross-connect element comprises a plurality of transport interface modules (TIMs) having receive sides connected to some transmission facilities of the network and transmit sides connected to other transmission facilities of the network.

Another specific object of the present invention is to provide a receive ID bus, a payload byte bus, a transmit ID bus, a cross-connect map memory and a payload memory within a cross-connect element of a digital communications network arranged so as to enable cross-connection of single or multiple DS0 channels in floating virtual tributaries that eliminates the need for locking the virtual tributaries to the digital network element's common system timing to carry out the cross-connect. This minimizes payload corruption caused by frequency differences between the incoming and outgoing transmission facilities.

In accordance with principles of the present invention, a method and apparatus is provided for cross-connecting payload bytes between two virtual tributaries at a cross-connect element within a communications network so as to minimize payload corruption and delay, and wherein the payload bytes have an incoming identifier related to the incoming virtual tributary and an outgoing identifier related to the outgoing virtual tributary, and further wherein at least one of the virtual tributaries is floating with respect to the incoming or outgoing SONET synchronous payload envelopes.

According to one embodiment of the invention, a method for cross-connecting arbitrary fragments of an incoming first digital transmission stream at a cross-connect element within a communications network without incurring a delay associated with first aligning a frame phase of the incoming first digital stream to a frame phase of any arbitrary frame timing reference of the cross-connect element, the arbitrary fragments being sized smaller than the complete first digital stream and comprising one or more incoming payload bytes, the first digital stream being a lowest transmission rate multibyte stream of any other multibyte streams it may be encapsulated and floating within, the incoming payload bytes having incoming identifiers related to their incoming locations and outgoing identifiers related to their outgoing locations, comprising the steps of:

looking up pre-recorded cross-connect information for the fragments in cross-connect map memory means at a fixed sequence of storage locations related to the incoming identifiers at times synchronous with the incoming first digital transmission multibyte stream, the cross-connect information providing outgoing identifiers for storing the incoming fragments in payload memory means;

presenting the outgoing identifiers stored in the cross-connect map memory means to an addressing input of the payload memory means at times synchronous with the incoming fragments so as to store the incoming fragments in the payload memory means;

reading the stored fragments from the payload memory means from a fixed sequence of storage locations related to the outgoing identifiers at times synchronous with an outgoing second digital transmission stream.

According to a second embodiment, a method for cross-connecting arbitrary fragments of an incoming first digital transmission stream at a cross-connect element within a communications network without incurring a delay associated with first aligning a frame phase of the first digital stream to a frame phase of any arbitrary frame timing reference of the cross-connect element, the arbitrary fragments being sized smaller than a complete virtual tributary of the first digital stream and comprising one or more incoming payload bytes, the first digital stream being a lowest transmission rate multibyte stream of any other multibyte streams it may be encapsulated and floating within, the incoming payload bytes having incoming identifiers related to their incoming locations and outgoing identifiers related to their outgoing locations, comprising the steps of:

storing the incoming fragments in payload memory means in a fixed sequence of storage locations related to the incoming identifiers at times synchronous with the incoming first digital transmission multibyte stream;

looking up pre-recorded cross-connect information for the fragments in cross-connect map memory means in a fixed sequence of storage locations related to the outgoing identifiers at times synchronous with an outgoing second digital transmission stream, the cross-connect information providing the identifiers for addressing the incoming fragments in the payload memory means;

presenting the incoming identifiers stored in the cross-connect map memory means to an addressing input of the payload memory means at times synchronous with the outgoing second digital stream so as to read the stored fragments from the payload memory means from random storage locations related to the incoming identifiers at times synchronous with the outgoing second digital transmission stream.

As used herein the term "multibyte" refers to any digital stream that includes more than one byte each transmission frame.

In one aspect of the first embodiment, cross-connect information is retrieved from the cross-connect map memory in synchronism with the incoming floating VT SPE from said incoming identifiers, the incoming payload bytes are recorded in the payload memory in synchronism with said incoming floating VT SPE at said outgoing identifiers supplied from the cross-connect map memory, and the payload bytes are subsequently sequentially read out to said outgoing floating VT SPE in synchronism therewith.

According to another aspect of the first embodiment, only one of the network element incoming side or outgoing side contains digital transmission streams that conform to a floating VT SONET-type standard, e.g. one that includes VT SPE and STS SPEs. More specifically, the network element incoming side could receive SONET-type payloads and cross-connect DS0s therein in floating mode and transmit cross-connected DS0s out on a locked SONET VT or on a non-SONET-type transmission format, i.e. one that is synchronous but contains no floating fragments or bytes therein, and conversely according to the invention non-floating-SONET-VT-type digital data could be received by the network element and cross-connected so as to be sent out in a floating VT SONET-type format.

In accordance with the present invention, a floating virtual tributary DS0 cross-connect comprises a plurality of interconnected TIMs, each module including a receive side connected to receive floating virtual tributaries from a first transmission facility, and a transmit side connected to send floating virtual tributaries to a second transmission facility, the receive side comprising processing logic for locating a floating virtual tributary within an incoming digital transport stream received from the first transmission facility by decoding and putting out a receive identifier at least for every payload byte, the transmit side comprising payload memory for storing payload bytes to be transmitted to the second transmission facility, and control logic for writing payload bytes into the payload memory and for causing payload bytes to be read out of the payload memory and formatted according to transmission standards including floating virtual tributary standards to the second transmission facility, a receive identifier bus connected to each receive side for carrying the receive identifier of said payload byte, a payload bus connected between all receive sides and all transmit sides for carrying each payload byte, a transmit identifier bus for providing a transmit identifier associated with each payload byte to the control logic of each transmit side, and a cross-connect map responsive to the receive identifier of each payload byte for generating and putting out over the transmit identifier bus the intended cross-connect destination of the payload byte in synchronism with the first transmission facility thereby to cause the payload byte to be stored in a payload memory and subsequently independently delivered into a virtual tributary outgoing to the second transmission facility in synchronism therewith.

In this facet of the first embodiment, one aspect is that the receive identifier bus is connected to the cross-connect map so that the receive identifier addresses the cross-connect map thereby to generate the transmit identifier for the particular payload byte and thereby to control the location within the payload memory at which that payload byte is stored, and wherein the payload memory sequentially puts out payload bytes including the particular payload byte in synchronism with the floating virtual tributary outgoing to the second transmission facility.

Alternately, the second embodiment comprises the steps of:

recording payload bytes into a payload memory of the cross-connect element in a fixed sequence of storage locations related to the incoming payload identity, at times synchronous with the incoming floating virtual tributary synchronous payload envelope, looking up pre-recorded cross-connect information from a cross-connect map memory of the cross-connect element at locations related to the outgoing payload identifier, at times synchronous with the outgoing floating virtual tributary synchronous payload envelope, the cross-connect information providing identifiers for reading payload bytes from the payload memory, presenting said payload byte identifiers stored in the cross-connect map memory to an addressing input of the payload memory at times synchronous with the outgoing floating virtual tributary synchronous payload envelope, thereby to read out the payload bytes to the outgoing floating virtual tributary synchronous payload envelope in synchronism therewith and without incurring delay associated with locking the incoming virtual tributary synchronous payload envelope to a local fixed timing reference frame.

In a further aspect of the second embodiment, the payload bytes are recorded in the payload memory in synchronism with and at identifiers related to said incoming floating VT SPE, cross-connect information is retrieved from the cross-connect map memory at said outgoing identifiers and is presented to the payload memory in synchronism with the outgoing floating VT SPE, whereupon payload bytes are read from random locations of the payload memory in synchronism with the outgoing floating VT SPE.

In this aspect of the present invention, a floating virtual tributary DS0 cross-connect comprises a plurality of interconnected TIMs, each module including a receive side connected to receive floating virtual tributaries from a first transmission facility, and a transmit side connected to send floating virtual tributaries to a second transmission facility, the receive side comprising processing logic for locating a floating virtual tributary within an incoming digital transport stream received from the first transmission facility by decoding a receive identifier at least for every payload byte and storing the payload byte at a location in a payload memory related to the receive identifier, the transmit side comprising logic for formatting payload bytes according to transmission standards including floating virtual tributary standards to be transmitted to the second transmission facility, and control logic capable of causing payload bytes to be requested at the times they are needed, a transmit identifier bus by means of which each transmission interface module transmit side can provide a transmit identifier associated with each payload byte to be transmitted, a receive identifier bus connected to each receive side for carrying the receive identifier of said payload byte, a payload bus connected between all receive sides and all transmit sides for carrying each payload byte, and a cross-connect map responsive to the transmit identifier for each payload byte for generating and putting out over the receive identifier bus the receive identifier for the payload byte in synchronism with a VT SPE to be sent to the second transmission facility thereby to cause the payload byte stored in the payload memory to be delivered into a virtual tributary outgoing from the second transmission facility in synchronism therewith.

In this facet of the invention, one aspect is that the payload memory stores payload bytes, including the particular payload byte in a fixed sequence in synchronism with the floating virtual tributary incoming to the first transmission facility and the transmit identifier bus is connected to the cross-connect map so that the transmit identifier addresses the cross-connect map in synchronism with the floating virtual tributary outgoing to the second transmission facility thereby to generate the receive identifier for the particular payload byte and thereby to control the location within the payload memory from which that payload byte is retrieved.

These and other objects, aspects, advantages and features of the present invention will be more fully understood and appreciated by those skilled in the art upon consideration of the following detailed description of preferred embodiments, presented in conjunction with the accompanying drawings.

DETAILED DESCRIPTION OF THE PREFERRED EMBODIMENTS

Figure 3:
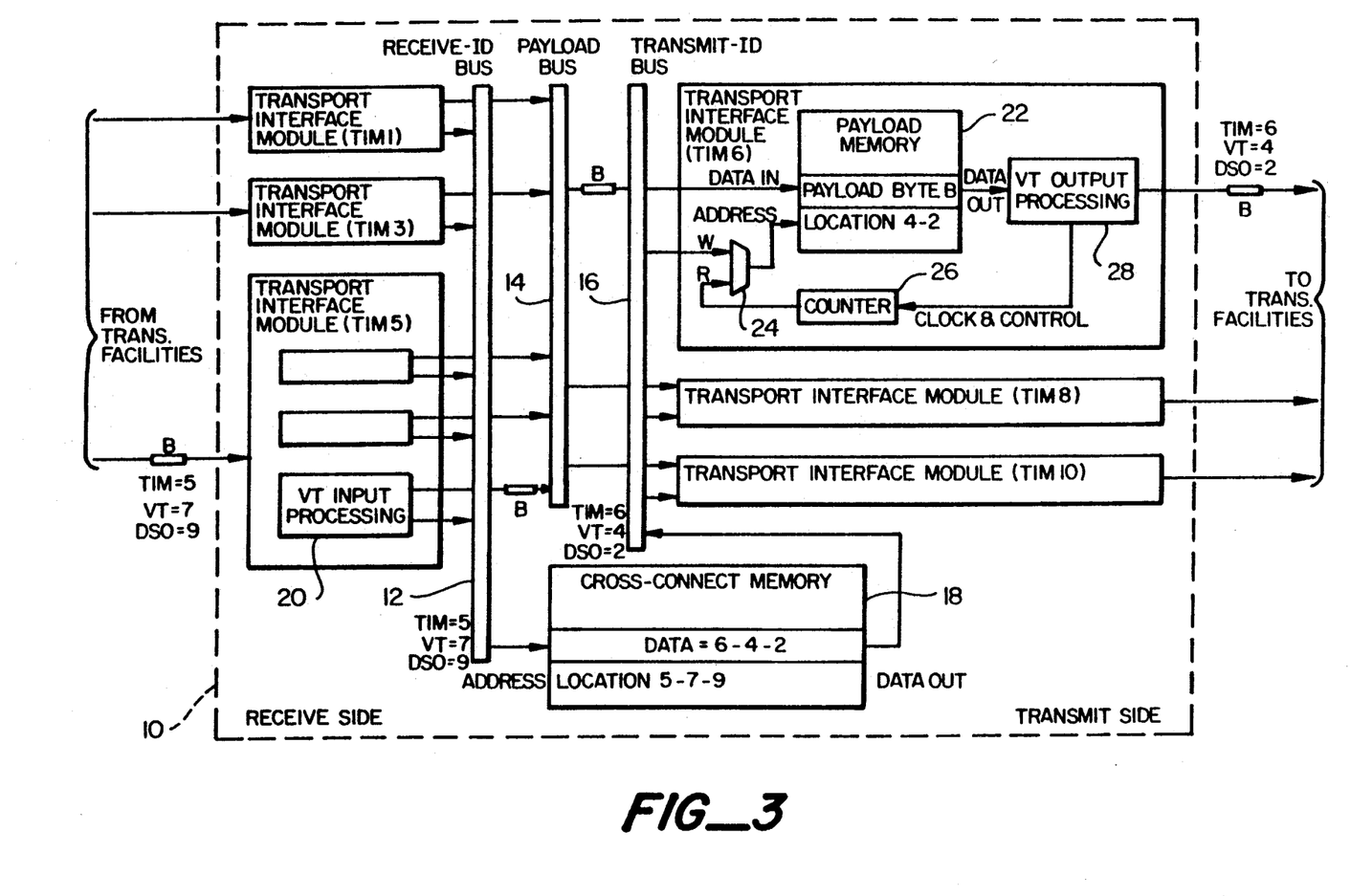
FIG. 3 is a block diagram illustrating part of a communications element or node providing DS0 cross-connect illustrating one presently preferred first embodiment of the present invention.

FIG. 3 illustrates part of a system 10 that provides DS0 cross-connect in a manner that illustrates one presently preferred embodiment of the present invention. The cross-connect node 10 comprises a number of transport interface modules (TIMs), including e.g. TIM#1, TIM#3 and TIM#5 (shown by way of example) on a receive side of the cross-connect 10; and TIM#6, TIM#8 and TIM#10 (also shown by way of example) on a transmit side of the cross-connect 10. Each TIM actually has an appearance on the receive side for its receive functions, and also has an appearance on the transmit side for its transmit functions. Thus, the separation of TIMs on the receive and transmit sides is made simply for clarification and to keep the receive and transmit functions separated in this description. In the FIG. 3 example, each receive side TIM includes VT input processing logic 20, and each transmit side TIM includes a payload memory 22, multiplexer 24, outgoing identifier sequence generator 26 and VT output processing logic 28.

Common elements between the receive side and the transmit side of the TIMs include a receive ID bus 12, a payload bus 14, a transmit ID bus 16, and a cross-connect map memory 18, as shown in FIG. 3. All common elements are time-division multiplexed, containing at least enough time slots such that one is available for every payload channel from every TIM in every 125-microsecond frame, including allowance for extra payload bytes that may appear due to frequency differences between timing on the various transmission facilities and the timing of the common element's control. A natural implementation of this criterion is to run the common elements at an integer multiple of the time slot rate of the highest-frequency transmission interface, the integer multiple depending on the total traffic transfer capability desired in the cross-connect equipment 10 so as to achieve full-access cross-connect for all channels simultaneously.

Each TIM may terminate a different transmission format, e.g. SONET, DS1, proprietary, etc., and a given TIM may terminate more than one digital transmission stream, multiplexed onto a single medium or carried over a number of separate media. There is no requirement or implication that all TIMs terminate SONET facilities. However, if the transmission facility format is not structured in SONET VTs, the TIM is understood to contain logic to represent the payloads to common elements 12, 14, 16, 18 in a subset of the form of VT SPEs. Logic to perform this function will be readily apparent from this description to those skilled in the art and is not discussed herein.

As a first example, it will be assumed that transport interfaces #5 and #6 are SONET-structured. Suppose it is desired to connect a single incoming DS0 from the receive side of the transport interface #5 through to the transmit side of the cross-connect 10. An incoming DS0 payload byte B appears physically somewhere on TIM#5, and it is assumed to be embedded in floating byte synchronous VT1.5 #7 as channel #9. Assume also that the cross-connected outgoing channel for payload byte B is to be TIM#6, VT (or DS1) #4 on channel #2, as illustrated in FIG. 3.

Facility termination logic contained within TIM#5 monitors the incoming SONET stream, recognizing its framing, tracking its pointers and locating the STS SPE and the various VTs. From the output of this logic, VT input processing logic 20 tracks the VT SPE pointers for each VT. Irrespective of the present invention, any SONET termination requires logic for each VT, although the logic may be time shared among some or all of the VTs. In a prior-art system, a variable delay of up to one frame is imposed in the VT input processing logic 20 to align a frame phase of each VT with the frame phase structure of the common elements 12, 14, 16 and 18, i.e. to convert from floating to locked mode.

In the present invention, no alignment delay is required. Instead, a VT-associated counter contained within the VT input processing logic 20 simply keeps track of the identity of each payload byte as it becomes manifest at the TIM. The counter is controlled by the VT pointer as well as by the rules for finding a VT payload within the STS SPE. As described below, the identity of each received byte then dynamically controls its disposition by the other elements of the cross-connect equipment 10.

Control logic, either hardware or software or both, assigns the various receive side TIMs and their various VTs to transmit in fixed sets (columns) of time slots on the receive ID bus 12 and on the payload bus 14. It must be appreciated that, although the VT as a whole can be mapped onto an assigned set of common element time slots, its floating nature makes it impossible to predict, a priori, which payload channel will appear in any given time slot. Because of the multiple-level pointer adjustments, a given payload channel may appear in different common element time slots over the course of a number of frames.

At each instant when TIM#5 is assigned to deliver a payload byte from VT#7 onto the payload bus 14, TIM#5 writes the full identity of the received payload byte onto the receive ID bus 12. In this case, the received payload byte's identity is TIM=5, VT=7, DS0=9. It will be recognized by those skilled in the art that any number of representations may be chosen for this information, without materially affecting the operation of the system, and in fact, the dynamically invariant part of the receive identifier, namely the TIM and VT identities, may not be explicitly generated by TIM#5 nor transferred explicitly as a field of the receive ID bus 12.

The receive ID information related to payload byte B placed on the receive ID bus 12 by TIM#5 is used to look up cross-connect information in the cross-connect map memory 18. In this first example, control software has separately loaded the cross-connect data value TIM=6, VT=4, DS0=2 into the cross-connect map memory 18 at a location corresponding to TIM=5, VT=7, DS0=9.

The output of the cross-connect map memory appears on the transmit ID bus 16 where it is examined by the transmit half of all of the TIMs in the cross-connect equipment 10. In this first example, TIM#6 recognizes its own identity and accepts the transmit ID, which provides TIM#6 with the specific location VT=4, DS0=2 in its payload memory 22 into which it stores the payload byte B. Thus, the payload memory 22 is loaded in a random order relative to the order of the incoming VT, according to identifier information provided over the transmit ID bus 16, with payload bytes transmitted from the payload bus 14 synchronously with the transmit ID bus 16.

Finally, at some later time synchronous with the outgoing transmission facility, a simple fixed sequence identifier generator 26, implemented with well-known techniques, causes byte B to be read from the payload memory 22 into the transmission facility connected to TIM#6 through logic 28 that re-formats it for the appropriate transmission standard, in this example as a SONET floating byte-synchronous VT. The multiplexer 24 within TIM#6 shown in FIG. 3 denotes switching of memory address sources for the payload memory 22 between the transmit ID bus 16 during write-in operations, and the identifier sequence generator 26 during read-out operations. VT output processing logic 28 controls the initialization of identifier generator 26 and the instants at which it advances, in keeping with the required timing of the outgoing virtual tributary.

Because only half of each TIM is shown in FIG. 3, a corresponding cross-connection would be expected to exist between TIM#6 and TIM#5 going in the other direction, to provide full duplex communication over the network. Thus, another payload byte B' (not shown) would be incoming on TIM#6, VT#4, DS0#2 and outgoing on TIM#5, VT#7, DS0#9. This reverse-direction cross-connection is preferably exactly equivalent to the first connection described hereinabove, or equivalent to a similar connection (embodiment 2) to be described by reference to FIG. 4.

Should a receive side TIM terminate a non-SONET transmission facility, simple logic on the receive side TIM generates receive ID outputs consistent with its received payload in such a way that the apparent VT structure across the payload bus 14 is preserved. Without loss of generality, such degenerate receive ID information may also be generated by logic associated with the common equipment at the cross-connect map memory 18.

Those skilled in the art will recognize and appreciate that the events described hereinabove as simultaneous must, in realistic implementations, be delayed through well-known pipelining techniques. These delays do not materially affect the present invention or its implementation, the term "synchronous" as used throughout herein including all such type of delays.

In the foregoing example described in conjunction with FIG. 3, a time slot interchange arrangement has been provided wherein the payload is written into the payload memory 22 in a random sequence under the control of the cross-connect map memory 18. The payload memory 22 is subsequently unloaded in a fixed sequence fashion under the control of a simple identifier generator 26.

A second embodiment for implementing time slot interchange is symmetric to the FIG. 3 approach. According to this symmetrical method, carried out by a cross-connect system 10' illustrated in FIG. 4, the payload bytes B are written into the payload memory 22 in a fixed sequence, and read out via random access to the payload memory 22 as controlled by a cross-connect map stored in the cross-connect map memory 18. This random access readout from the cross-connect map memory 18 is controlled by having the incoming identifiers for the incoming payload bytes stored in the cross-connect map memory 18 read out therefrom in a fixed sequence under control of VT output processing logic 28 in synchronism with the outgoing floating VT SPE by inputting the outgoing identifiers into the map memory 18.

In conventional arrangements for time slot interchange, all transmission facility inputs are first aligned such that their frame start times coincide. It is one aspect and purpose of the present invention to obviate and avoid the need for any such alignment. Thus, the concept of sequentially writing payload bytes into payload memory must be understood to refer to each incoming transmission facility separately. The random frame alignment of the various incoming transmission facilities precludes global sequentiality.

Figure 4:
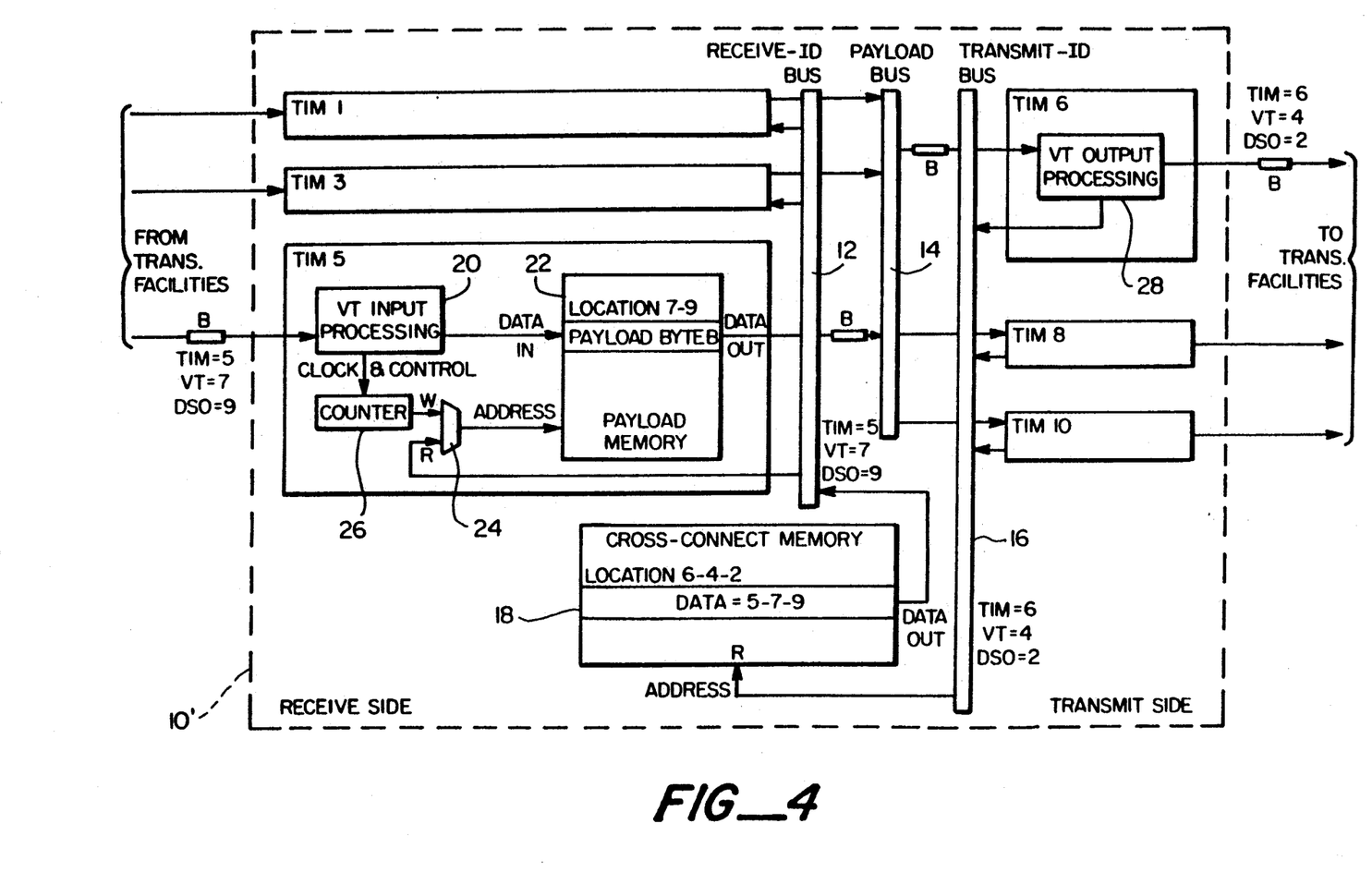
FIG. 4 is similar to FIG. 3 and illustrates a second presently preferred embodiment of the present invention.

FIG. 4 is an adaptation of FIG. 3 and shows how a symmetric implementation of the FIG. 3 example may be organized. In the FIG. 4 example, payload memory 22 resides in the receive side of the TIM. Payload bytes B are sequentially stored in payload memory 22 under addressing control of the VT input processing logic 20. The sequential aspect of payload byte storage is emphasized by showing the counter 26 as the identifier or address generator, controlled by VT input processing logic 20.

Using the same example as given above, the payload byte B is first captured into location 7-9 of the payload memory 22 of TIM#5, under the addressing control of the VT input processing logic 20.

At some later time, TIM#6 requires the availability of payload byte B for transmission in channel 2 of VT#4. TIM#6 writes the value 6-4-2 onto the transmit ID bus 16. The cross-connect map memory 18 is addressed by the transmit ID bus 16. The output of the cross-connect map memory 18 in the FIG. 4 example is the receive ID random identifier 5-7-9. TIM#5 recognizes its own identifier and reads payload byte B from location 7-9 of its payload memory 22 onto the payload bus 14 such that the payload byte B becomes available to the outgoing transmission interface module TIM#6.

It will be recognized by those skilled in the art that if it is permitted to synchronize all transmit-side outputs to the common element's framing and timing, a single common identifier or address sequence generator could be substituted for the per-VT identifier generators contained in the VT output processing logic 28 of each transmission interface module of FIG. 4.

The following discussion describes a sequence of logical activities necessary to determine the receive ID. Consider two cases: the termination of a SONET transmission facility, and the termination of a conventional (non-SONET) transmission facility, such as a DS1 signal from a T-carrier system. The following structures are defined in the ANSI SONET reference T1.105-1988 identified hereinabove.

1. Find the SONET frame start. This is simply a pattern match on the framing signal carried in the SONET bit stream. It may be desirable to generate a special receive ID code when these bytes are detected, for possible ancillary use by other TIMs.
2. From the SONET start of frame, count bytes to find the STS SPE pointer and the so-called H4 multiframing indicator byte. It may be desirable to generate special receive ID codes when these bytes are detected, for possible ancillary use by other TIMs.
3. From the STS SPE pointer, find the start of the STS SPE frame. It is necessary to track changes in the value of the pointer that cause the STS SPE frame to move from time to time relative to the SONET frame.
4. From the STS SPE frame, find the VT pointers. The VT pointers are in well-defined locations relative to the start of the STS SPE frame, and further relative to the multiframe timing indicated by the H4 byte. Again, it may be desirable to generate special receive ID indicators when the VT pointer bytes occur, for possible ancillary use by the other TIMs.
5. From each VT pointer, count bytes within the VT structure to find the start of the VT SPE frame. Again, it is necessary to track changes in VT pointer values, as the VTs are floating.
6. From each byte of each VT SPE frame, generate a byte count synchronized with the start of the VT SPE frame derived in step 5 above. This is the dynamic part of the receive ID. Depending upon the details of the particular implementation, all bytes of the VT SPE frame may be counted, or only the payload bytes B may be counted, with the other overhead VT SPE bytes indicated through special codes or ignored completely. The preferred implementation is to count only payload bytes B within each VT SPE frame, and to generate special receive ID codes for other VT SPE frame bytes, especially bytes carrying signaling information.

7. The VT number and the TIM number fields of the receive ID may be derived from software programmed registers, from hardware straps, from designed-in structures for identification, or from a combination of these known techniques. Because these fields are dynamically invariant, they may be generated as part of the common equipment of the cross-connect element 10, and may be implicit, rather than being physically transmitted on the receive ID bus. Logic for generating these identification fields is well within the ability of those skilled in the art and may take a wide variety of forms.

8. According to the time slot allocation rules of the common elements, read and write payload and ID information onto the various busses 12, 14 and 16 as described in the functional descriptions above.

The following discussion applies to conventional transmission facility terminations within the cross-connect equipment 10 (FIG. 3) or 10' (FIG. 4). Without loss of generality, consider the case of a DS1 terminating on the receive side of a TIM. As a part of the initialization of the facility 10, the DS1 will be allocated a set of common element time slots during which it is authorized to write onto the payload bus 14 and the receive ID bus 12 or the transmit ID bus 16. A preferred implementation is to allocate the DS1 three columns of nine rows of bytes, emulating the structure of a SONET VT1.5 frame.

During each of its authorized time slots, the TIM terminating the DS1 generates a receive ID field that matches the encoding of the equivalent SONET field. At a minimum, this includes a count for each byte of the payload, as explained under step 6 above. Other bytes e.g. to transfer signaling information, may also be written to the payload bus 14, depending upon the details of particular implementations. If such other bytes appear on the bus 14, they must also be identified with receive and transmit ID codes compatible with the overall design of the system 10, 10'.

The examples given in FIGS. 3 and 4 are preferred implementations inasmuch as they are efficient in their total use of map memory throughout the cross-connect equipment 10, and their lack of redundancy simplifies programming and maintenance. However, they incur a penalty in interconnection count, because every transmission interface module must connect to both ID buses 12 and 16 as well as the payload bus 14. A variety of additional implementation alternatives is possible, retaining the principles of the present invention while conserving interconnections. These alternatives eliminate one or the other of the global ID busses 12 and 16 by replicating either or both of payload or cross-connect memories 22 and 18 on the transmit or receive side of each transmission interface module. While ID information still exists, it is locally contained within each transmission interface module.

Thus, the present invention contemplates that the ID buses 12 and 16 may be common to all or a number of TIMs of the cross-connect 10 or that those buses may be localized within each TIM.

In the examples given in FIGS. 3 and 4, the ID buses 12 and 16 carry the full identity of the pertinent channels: TIM number, VT number and channel number, for example. As remarked earlier, a number of choices exist for representation and conveyance of the dynamically invariant TIM and VT numbers without materially affecting the operation of the system.

Those skilled in the art will appreciate that a tradeoff may be made between the amount of information available on the ID buses 12 and 16 and the amount of logic in the ID bus interfaces. For example, a small number of bus signals could be encoded to indicate the presence of SONET and VT pointers, from which counter logic in the common equipment could derive payload identifiers. In the extreme case, the receive ID bus 12 could disappear completely, and logic could be provided to monitor SONET and VT overhead bytes, including pointers, written directly onto the payload bus 14. From these overhead bytes, the logic could deduce the entire structure of the SONET frame. This approach is taken by the draft ComBus proposal, "A Backplane Bus and Package for SONET Applications" and "A Backplane Bus and Package for SONET Applications—Logical Layer and Protocols," IEEE P.1396x/D6.0a and P.1396.1/D6.0a, the disclosures of which are incorporated herein by reference.

One of the principles of the present invention is that the receive logic 20 functions to explicitly identify each dynamically varying payload byte to the other parts of the cross-connect element.

Although the invention has been described by reference to certain preferred embodiments thereof, it is not to be limited thereby and is to be limited only by the appended claims.

What is claimed is:

1. A method for cross-connecting arbitrary fragments of an incoming first digital transmission stream at a cross-connect element within a communications network without incurring a delay associated with first aligning a frame phase of the incoming first digital stream to a frame phase of any arbitrary frame timing reference of the cross-connect element, the arbitrary fragments being sized smaller than the complete first digital stream and comprising one or more incoming payload bytes, the first digital stream being a lowest transmission rate multibyte stream of any other multibyte streams it may be encapsulated and floating within, the incoming payload bytes having incoming identifiers related to their incoming locations and outgoing identifiers related to their outgoing locations, comprising the steps of:

looking up pre-recorded cross-connect information for the fragments in cross-connect map memory means at a fixed sequence of storage locations related to the incoming identifiers at times synchronous with the incoming first digital transmission multibyte stream, the cross-connect information providing outgoing identifiers for storing the incoming fragments in payload memory means;

presenting the outgoing identifiers stored in the cross-connect map memory means to an addressing input of the payload memory means at times synchronous with the first digital transmission multibyte stream so as to store the incoming fragments in the payload memory means;

reading the stored fragments from the payload memory means from a fixed sequence of storage locations related to the outgoing identifiers at times synchronous with an outgoing second digital transmission stream.

2. The method of claim 1, the arbitrary frame timing reference comprising a frame timing of a backplane of the cross-connect element.

3. The method of claim 2, the arbitrary frame timing reference further comprising a frame timing of an incoming third digital transmission stream having a transmission rate higher than the first digital stream, the first digital stream being encapsulated within and floating relative to the third digital stream.

4. The method of claim 3, the arbitrary frame timing reference further comprising a frame timing of an incoming fourth digital transmission stream, the third digital transmission stream being encapsulated within and floating relative to the fourth digital transmission stream, the fourth digital stream comprising a SONET OC-N or STS-N digital stream.

5. The method of claim 4, the arbitrary frame timing reference further comprising a frame timing of outgoing fifth and sixth digital transmission streams both of which have a transmission rate higher than that of the second digital transmission stream, the second digital transmission stream being encapsulated within and floating relative to the fifth digital transmission stream which in turn is encapsulated within and floating relative to the sixth digital transmission stream, the sixth digital stream comprising a SONET OC-N or STS-N digital stream.

6. The method of claim 1, the second digital stream being synchronous and containing no floating virtual tributaries, floating fragments or floating bytes therein.

7. The method of claim 1, the arbitrary fragments each comprising a single DS0 channel having its own incoming and outgoing identifier, the incoming identifier comprising an incoming payload identifier, the outgoing identifier comprising an outgoing payload identifier.

8. The method of claim 1, the fragments being stored in the payload memory means in a random sequence relative to their incoming sequence under control of the cross-connect map memory means, the fragments being read from payload memory in a fixed sequence fashion governed by the outgoing second digital stream under control of a fixed sequence identifier generator.

9. A method for cross-connecting arbitrary fragments of an incoming first digital transmission stream at a cross-connect element within a communications network without incurring a delay associated with first aligning a frame phase of the first digital stream to a frame phase of any arbitrary frame timing reference of the cross-connect element, the arbitrary fragments being sized smaller than a complete virtual tributary of the first digital stream and comprising one or more incoming payload bytes, the first digital stream being a lowest transmission rate multibyte stream of any other multibyte streams it may be encapsulated and floating within, the incoming payload bytes having incoming identifiers related to their incoming locations and outgoing identifiers related to their outgoing locations, comprising the steps of:

storing the incoming fragments in payload memory means in a fixed sequence of storage locations related to the incoming identifiers at times synchronous with the incoming first digital transmission multibyte stream;

looking up pre-recorded cross-connect information for the fragments in cross-connect map memory means in a fixed sequence of storage locations related to the outgoing identifiers at times synchronous with an outgoing second digital transmission stream, the cross-connect information providing the incoming identifiers for addressing the incoming fragments in the payload memory means;

presenting the incoming identifiers stored in the cross-connect map memory means to an addressing input of the payload memory means at times synchronous with the outgoing second digital stream so as to read the stored fragments from the payload memory means from random storage locations related to the incoming identifiers at times synchronous with the outgoing second digital transmission stream.

10. The method of claim 9, the arbitrary frame timing reference comprising a frame timing of a backplane of the cross-connect element.

11. The method of claim 10, the arbitrary frame timing reference further comprising a frame timing of an incoming third digital transmission stream having a transmission rate higher than the first digital stream, the first digital stream being encapsulated within and floating relative to the third digital stream.

12. The method of claim 11, the arbitrary frame timing reference further comprising a frame timing of an incoming fourth digital transmission stream, the third digital transmission stream being encapsulated within and floating relative to the fourth digital transmission stream, the fourth digital stream comprising a SONET OC-N or STS-N digital stream.

13. The method of claim 12, the arbitrary frame timing reference further comprising a frame timing of outgoing fifth and sixth digital transmission streams both of which have a transmission rate higher than that of the second digital transmission stream, the second digital transmission stream being encapsulated within and floating relative to the fifth digital transmission stream which in turn is encapsulated within and floating relative to the sixth digital transmission stream, the sixth digital stream comprising a SONET OC-N or STS-N digital stream.

14. The method of claim 9, the second digital stream being synchronous and containing no floating virtual tributaries, floating fragments or floating bytes therein.

15. The method of claim 9, the arbitrary fragments each comprising a single DS0 channel having its own incoming and outgoing identifier, the incoming identifier comprising an incoming payload identifier, the outgoing identifier comprising an outgoing payload identifier.

16. The method of claim 9, the fragments being stored in the payload memory means in a fixed sequence fashion relative to the incoming first digital stream, the fragments being read from the payload memory means in a random fashion relative to their incoming sequence under control of incoming identifiers obtained from the cross-connect map memory means that correspond to the outgoing identifiers, the incoming identifiers being used for addressing the payload memory means.

17. A cross-connect element for cross-connecting arbitrary fragments of an incoming first digital transmission stream within a communications network without incurring a delay associated with aligning a frame phase of the first digital stream to a frame phase of any arbitrary frame timing reference of the cross-connect element, the arbitrary fragments being sized smaller than a complete virtual tributary of the first digital stream and comprising one or more incoming payload bytes, the first digital stream being a lowest transmission rate multibyte stream of any other multibyte streams it may be encapsulated and floating within, the incoming payload bytes having incoming identifiers related to their incoming locations and outgoing identifiers related to their outgoing locations, comprising:

means for looking up pre-recorded cross-connect information for the fragments in cross-connect map memory means at a fixed sequence of storage locations related to the incoming identifiers at times synchronous with the incoming first digital transmission multibyte stream, the cross-connect information providing outgoing identifiers for storing the incoming fragments in payload memory;

means for presenting the outgoing identifiers stored in the cross-connect map memory means to an addressing input of payload memory means at times synchronous with the incoming first digital transmission multibyte stream so as to store the incoming fragments in the payload memory means;

means for reading the stored fragments from the payload memory means from a fixed sequence of storage locations related to the outgoing identifiers at times synchronous with an outgoing second digital transmission stream.

18. The cross-connect element of claim 17, the fragments being stored in the payload memory means in a random sequence relative to their incoming sequence under control of the cross-connect map memory means, the fragments being read from the payload memory means in a fixed sequence fashion relative to the outgoing second digital stream under control of a fixed sequence identifier generator.

19. A cross-connect element for cross-connecting arbitrary fragments of an incoming first digital transmission stream within a communications network without incurring a delay associated with aligning a frame phase of the first digital stream to any arbitrary frame timing reference of the cross-connect element, the arbitrary fragments being sized smaller than a complete virtual tributary of the first digital stream and comprising one or more incoming payload bytes, the first digital stream being a lowest transmission rate multibyte stream of any other multibyte streams it may be encapsulated and floating within, the incoming payload bytes having incoming identifiers related to their incoming locations and outgoing identifiers related to their outgoing locations, comprising:

means for storing the incoming fragments in payload memory means in a fixed sequence of storage locations related to the incoming identifiers at times synchronous with the incoming first digital transmission multibyte stream;

means for looking up pre-recorded cross-connect information for the fragments in cross-connect map memory means at a fixed sequence of storage locations related to the outgoing identifiers at times synchronous with an outgoing second digital transmission stream, the cross-connect information providing the incoming identifiers for addressing the incoming fragments in the payload memory means;

means for presenting the incoming identifiers stored in the cross-connect map memory means to an addressing input of the payload memory means at times synchronous with the outgoing digital stream so as to read the stored fragments from the payload memory means from random storage locations related to the incoming identifiers at times synchronous with the outgoing second digital transmission stream.

20. The cross-connect element of claim 19, the fragments being stored in the payload memory means in a fixed sequence fashion relative to the incoming first digital stream, the fragments being read from the payload memory means in a random fashion relative to their incoming sequence under control of incoming identifiers obtained from the cross-connect map memory means that correspond to the outgoing identifiers, the incoming identifiers being used for addressing the payload memory means.

* * * * *